United States Patent
Mancier et al.

(10) Patent No.: US 10,563,808 B2
(45) Date of Patent: Feb. 18, 2020

(54) TUBE LEAK REPAIR CLAMP SEALING APPARATUS FOR USE IN A NUCLEAR POWER PLANT

(71) Applicant: Framatome Inc., Lynchburg, VA (US)

(72) Inventors: David Lee Mancier, Lynchburg, VA (US); Stephan Mark Hunter, Evington, VA (US)

(73) Assignee: Framatome Inc., Lynchburg, VA (US)

( * ) Notice: Subject to any disclaimer, the term of this patent is extended or adjusted under 35 U.S.C. 154(b) by 309 days.

(21) Appl. No.: 15/456,547

(22) Filed: Mar. 12, 2017

(65) Prior Publication Data
US 2018/0259110 A1 Sep. 13, 2018

(51) Int. Cl.
*F16L 55/17* (2006.01)
*F16L 55/178* (2006.01)

(52) U.S. Cl.
CPC ............ *F16L 55/178* (2013.01); *F16L 55/17* (2013.01)

(58) Field of Classification Search
CPC ......... F16L 17/04; F16L 55/16; F16L 55/168; F16L 55/17; F16L 55/172; F16L 55/1725; F16L 55/178
USPC .................. 285/15, 335, 337, 351, 372, 373
See application file for complete search history.

(56) References Cited

U.S. PATENT DOCUMENTS

| | | | |
|---|---|---|---|
| 1,940,729 A | 12/1933 | Pfefferle | |
| 3,744,822 A * | 7/1973 | Arnold | F16L 1/26 138/99 |
| 3,971,579 A | 7/1976 | Brown | |
| 4,050,720 A * | 9/1977 | Reneau | F16L 41/06 285/133.11 |
| 4,223,925 A * | 9/1980 | Reneau | F16L 1/26 285/197 |
| 4,889,370 A * | 12/1989 | Firestone | F16L 55/171 285/342 |
| 5,124,112 A | 6/1992 | Borrman et al. | |
| 5,538,261 A * | 7/1996 | Murray | F16J 15/186 165/173 |
| 5,590,913 A | 1/1997 | Morris et al. | |
| 2008/0012289 A1* | 1/2008 | Goble | F16L 55/178 285/15 |

(Continued)

FOREIGN PATENT DOCUMENTS

| | | |
|---|---|---|
| CH | 225 024 A | 12/1942 |
| EP | 3124847 | 2/2017 |

*Primary Examiner* — Aaron M Dunwoody
(74) *Attorney, Agent, or Firm* — Davidson, Davidson & Kappel, LLC

(57) ABSTRACT

A clamp sealing apparatus configured for preventing leakage from a defective region of a tube is provided. The clamp sealing apparatus includes a first clamping section and second clamping section tangentially connected to each other; and a seal held by the first and second clamping sections. Each of the first and second clamping sections includes a segment of a clamp body and a segment of a compression section. The clamp body and the compression section is configured for axially compressing the seal between the clamp body and the compression section such that the seal is pressed radially against an outer diameter surface of the tube onto the defective region by the axial compression to seal the defective region. A method of sealing a defective region of a tube to prevent fluid leakage through the defective region is also provided.

20 Claims, 3 Drawing Sheets

(56) References Cited

U.S. PATENT DOCUMENTS

| | | | | |
|---|---|---|---|---|
| 2010/0059990 A1* | 3/2010 | Avery | ................... | F16L 37/008 |
| | | | | 285/197 |
| 2012/0306191 A1* | 12/2012 | Smith | ................... | F16L 55/172 |
| | | | | 285/15 |
| 2013/0255816 A1* | 10/2013 | Benson | ................... | F16L 55/17 |
| | | | | 138/99 |
| 2017/0030505 A1* | 2/2017 | Bowie | ................... | F16L 21/007 |

* cited by examiner

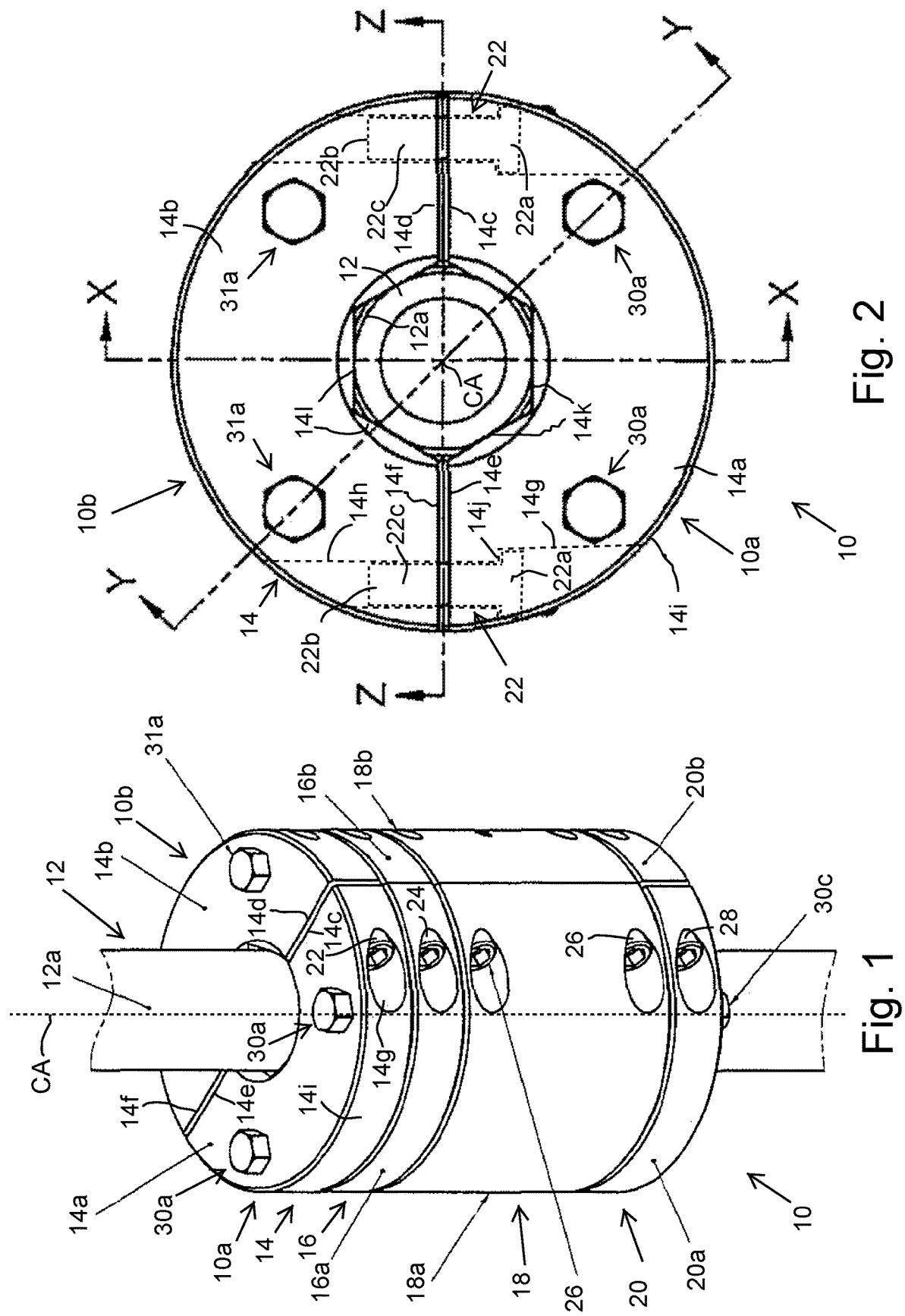

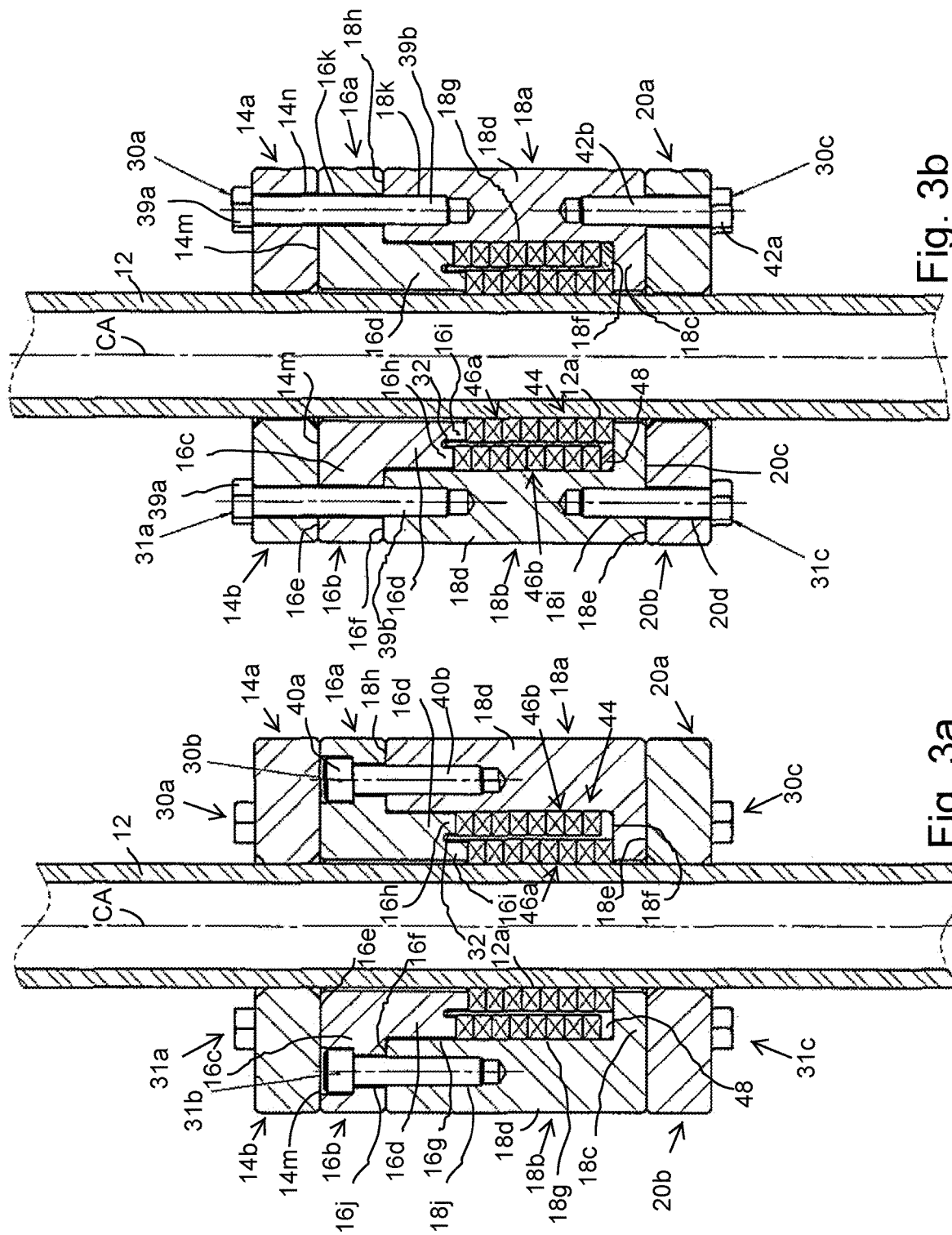

TUBE LEAK REPAIR CLAMP SEALING APPARATUS FOR USE IN A NUCLEAR POWER PLANT

The present disclosure relates generally to the repair of tube leaks in a nuclear power plant and more specifically to methods of clamping tube leaks in a nuclear power plant.

BACKGROUND

High pressure tubes, in the form of piping or nozzles, particularly those in the pressure range of 500 to 3500 psig in nuclear power plants, can develop leaks during operation of the nuclear power plant. Repair clamps exist for sealing through wall leaks; however, they are limited to low pressure applications. A through-wall leak in a high pressure pipe or nozzle is typically repaired by a welding process. The defective area is either cut off and replaced by welding a new section in place, or a weld overlay is applied over the defect (crack) to seal the defect (crack) and provide a new pressure boundary. The best known solutions today involve welding/weld repair.

SUMMARY OF THE INVENTION

Welding/weld repair is a viable solution; however, a drawback to the weld repair option is the amount of time required to design, qualify, analyze, and implement the weld repair solution. When a power plant is forced to shut down due to an emergent leak, the goal is to get the power plant back on line as quickly as possible while meeting all safety requirements. A weld repair solution could easily take two to three weeks to implement.

In view of this, an object of the invention is a tube leak repair clamp sealing apparatus and method that can advantageously be installed in less than one shift, thereby returning the power plant to service and minimizing the amount of lost revenue. The tube, which can have a pressure range of 500 to 3500 psig, can be in the form of a pipe or nozzle, including instrumentation nozzles in PWR and BWR vessels, Reactor Coolant System piping (e.g. High Pressure Injection, Pressurizer Spray, Drain/Let Down), Feedwater piping, Main Steam piping and Emergency Core Cooling piping.

A clamp sealing apparatus configured for preventing leakage from a defective region of a tube is provided. The clamp sealing apparatus includes a first clamping section and second clamping section tangentially connected to each other; and a seal held by the first and second clamping sections. Each of the first and second clamping sections includes a segment of a clamp body and a segment of a compression section. The clamp body and the compression section is configured for axially compressing the seal between the clamp body and the compression section such that the seal is pressed radially against an outer diameter surface of the tube onto the defective region by the axial compression to seal the defective region.

A method of sealing a defective region of a tube to prevent fluid leakage through the defective region is also provided. The method includes tangentially connecting segments of a clamp body to each other and fixing the clamp body to the tube; inserting a seal between a portion of the clamp body and an outer diameter surface of the tube; and tangentially connecting segments of a compression section to each other and axially compressing the seal between the clamp body and the compression section such that the seal is pressed radially against the outer diameter surface of the tube by the axial compression onto the defective region to seal the defective region.

BRIEF DESCRIPTION OF THE DRAWINGS

The present invention is described below by reference to the following drawings, in which:

FIG. 1 shows a perspective view of a clamp sealing apparatus in accordance with an embodiment of the present invention fixed to a nuclear power plant tube to repair a leak in a tube;

FIG. 2 shows a plan view of clamp sealing apparatus shown in FIG. 1 on the tube;

FIG. 3a shows clamp sealing apparatus as viewed along X-X in FIG. 2;

FIG. 3b shows clamp sealing apparatus as viewed along Y-Y in FIG. 2.

DETAILED DESCRIPTION

Figure 3C:
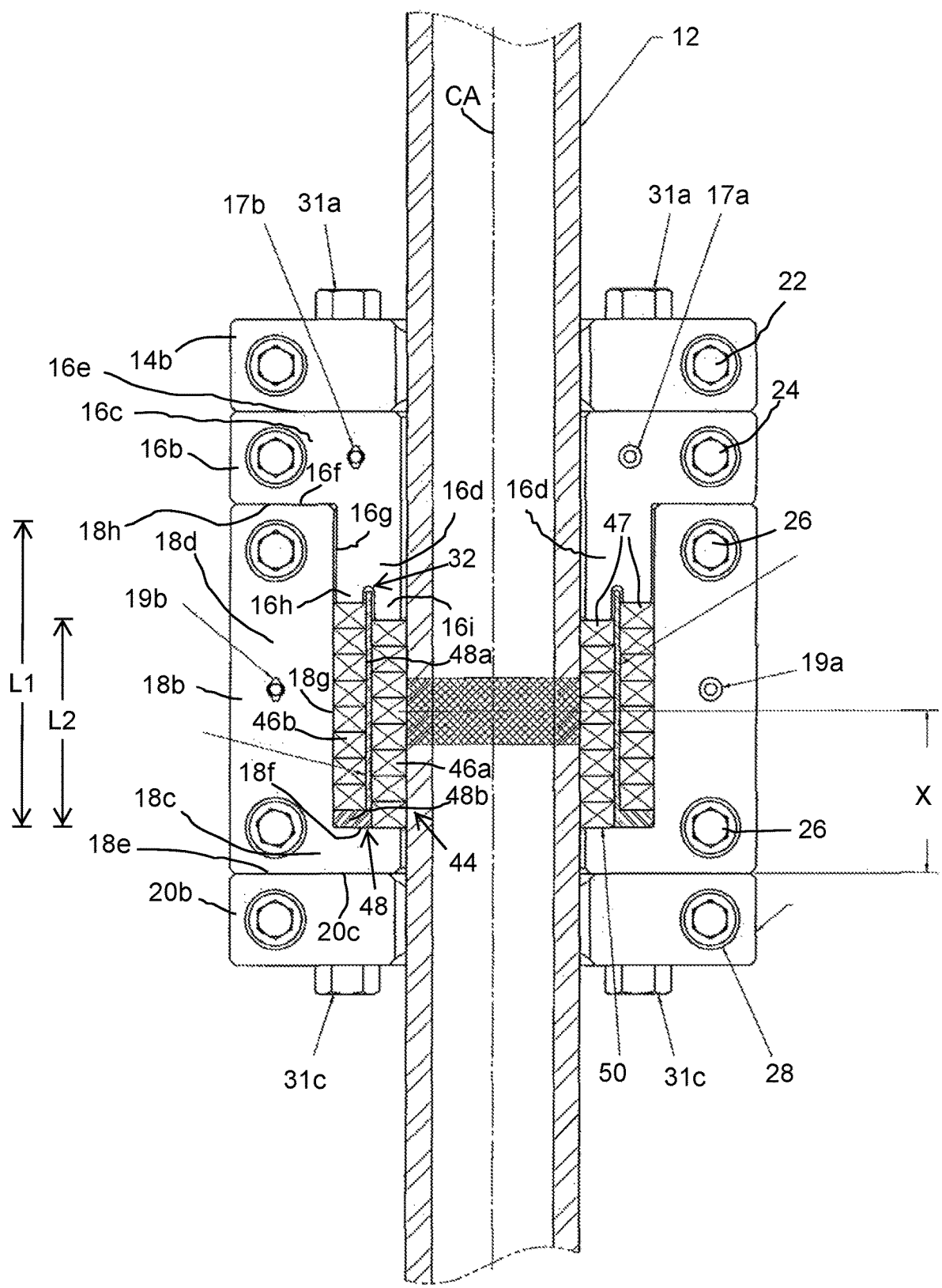
FIG. 3c shows a clamp sealing apparatus as viewed along Z-Z in FIG. 2, except with tangentially extending fasteners shown in their entirety.

The present disclosure provides a tube leak repair clamp sealing apparatus that can advantageously be installed in less than one shift, thereby returning the power plant to service and minimizing the amount of lost revenue. The clamp sealing apparatus includes a seal provided by several layers of graphite packing material being compressed inside a split clamp body by a compression ring. The repair clamp sealing apparatus also provides pipe whip protection in the event of a complete rupture at the existing crack by integral clamps on either end of the repair clamp sealing apparatus.

Preferred embodiments of the invention can provide a different, e.g., non-welded, approach to repairing a through-wall leak in a high pressure straight section of pipe or nozzle, including ASME Boiler and Pressure Vessel Code, Section III, Class 1, 2, and 3 pressure boundary applications. In one preferred embodiment, the clamp sealing apparatus clamps around the tube, e.g., the pipe or nozzle, and seals across the through-wall crack by compressing several layers of graphite packing material.

The clamp sealing apparatus incorporates clamps on either end of the device to hold the pipe sections together in the event of a full 360 degree circumferential crack. The advantages of installing the repair clamp sealing apparatus over a weld repair include the reduction in down time from two to three weeks to one shift. The repair clamp sealing apparatus may not be a permanent solution, whereas a weld repair is usually permanent. When a leak is discovered during an outage, the utility may often prefer a quick solution to bring the plant back on-line quickly. Installing the repair clamp apparatus provides the quick solution while allowing the utility time to prepare for the permanent solution to be implemented during a future scheduled downtime.

FIG. 1 shows a perspective view of a clamp sealing apparatus 10 in accordance with an embodiment of the present invention fixed to a nuclear power plant tube 12 to repair a leak in tube 12. FIG. 2 shows a plan view of clamp sealing apparatus 10 on tube 12. Clamp sealing apparatus 10 is comprised of a two sections 10a, 10b—a first clamping section 10a and a second clamping section 10b, each including four separate ring segments that define four support parts—a first clamp end 14, a compression section 16, a clamp body 18 and a second clamp end 20. First section 10a includes ring segments in the form of a first clamp end segment 14a, a compression segment 16a, a clamp body segment 18a and a second clamp end segment 20a. Similarly, second section 10b includes ring segments in the form of a first clamp end segment 14b, a compression segment 16b, a clamp body segment 18b and a second clamp end segment 20b. Accordingly, first clamp end 14 is formed by segments 14a, 14b, compression section 16 is formed by segments 16a, 16b, clamp body 18 is formed by segments 18a, 18b and second clamp end 20 is formed by segments 20a, 20b. Each of the ring segments is a half ring that forms an arc spanning 180 degrees. Each of the ring segments of first section 10a is tangentially connected to the corresponding ring segment of second section 10b by two fasteners.

More specifically, clamp end segment 14a is tangentially connected to clamp end segment 14b by a set of fasteners 22—here two fasteners—with a first fastener 22 extending tangentially through a first circumferential end 14c, 14d, respectively, of each of segments 14a, 14b and a second fastener 22 extending tangentially through a second circumferential end 14e, 14f, respectively, of each of segments 14a, 14b. As used herein, the terms tangentially, radially, axially and circumferentially are used with respect to a center axis CA of clamp sealing apparatus 10, which is also the center axis of tube 12 when clamp sealing apparatus is installed on tube 12, unless otherwise noted. Fasteners 22 apply tangential forces to both clamp end segments 14a, 14b. As shown by viewing FIGS. 1 and 2 together, each fastener 22 includes a head 22a received in a hole 14g in segment 14a and a tail end 22b, i.e., a free end of a shank 22c of fastener 22, received in a hole 14h in segment 14b. Each hole 14g has a stepped shape formed by a larger diameter portion for receiving head 22a that intersects an outer circumferential surface 14i of segment 14a and a smaller diameter portion for receiving shank 22c that intersects the respective circumferential end 14c, 14e, with a shoulder 14j which head 22a contacts during clamping joining the smaller and larger diameter portions. Each hole 14h has a threaded inner diameter surface for receiving a threaded portion of shank 22c that has a threaded outer diameter surface.

Similarly, compression segment 16a is tangentially connected to compression segment 16b by a set of fasteners 24, clamp body segment 18a is tangentially connected to clamp body 18b by two sets of fasteners 26 and second clamp end segment 20a is tangentially connected to second clamp end segment 20b by a set of fasteners 28. In the embodiment of FIGS. 1 and 2, each of segments 16a, 18a, 20a includes holes formed in the same manner as holes 14g (segment 18a includes two sets), each of segments 16b, 18b, 20b includes holes formed in the same manner as holes 14h (segment 18b includes two sets) and each of fasteners 24, 26, 28 is formed in the same manner as fasteners 22. Accordingly, sections 10a, 10b are tangentially connected together by fasteners 22, 24, 26, 28 and tangentially clamp tube 12 from opposite sides of tube 12 via the tangential forces generated by fasteners 22 and 28. In this embodiment, fasteners 24, 26 do not contribute to the clamping force on tube 12, as clearance exists between segments 16a, 16b, 18a, 18b and the outer diameter surface of tube 12.

Clamp sealing apparatus 10 also includes at least one fastener for holding segments 14a, 16a, 18a, 20a together and at least one fastener for holding segments 14b, 16b, 18b, 20b together. In the embodiment shown in FIG. 1, the at least one fastener for holding segments 14a, 16a, 18a, 20a together includes two fasteners 30a extending through segments 14a, 16a, 18a (see FIG. 3b), two fasteners 30b extending through segments 16a, 18a (see FIG. 3a) and two fasteners 30c extending through segments 18a, 20a (see FIG. 3a and FIG. 3b). Similarly, at least one fastener for holding segments 14b, 16b, 18b, 20b together includes two fasteners 31a extending through segments 14b, 16b, 18b, two fasteners 31b extending through segments 16b, 18b (see FIG. 3a) and two fasteners 31c extending through segments 16b, 18b (see FIG. 3a and FIG. 3b). Each of fasteners 30a, 30b, 30c are oriented such that fasteners 30a, 30b, 30c each longitudinally extend in the axial direction through corresponding holes in the respective segments 14a, 16a, 18a, 20a and each of fasteners 31a, 31b, 31c are oriented such that fasteners 31a, 31b, 31c each longitudinally extend in the axial direction through corresponding holes in the respective segments 14b, 16b, 18b, 20b. Fasteners 30a, 30b, 30c, 31a, 31b, 31c act to axially clamp the segments of the corresponding sections 10a, 10b together.

As shown in FIG. 2, an inner diameter surface of clamp end segment 14a can be formed by a plurality of walls 14k each extending tangentially with respect to outer diameter surface 12a of tube 12 and an inner diameter surface of clamp end segment 14b can be formed by a plurality of walls 14l each extending tangentially with respect to outer diameter surface 12a of tube 12. In the preferred embodiment of FIG. 2, each segment 14a, 14b includes three walls 14k, 14l, respectively, such that walls 14k, 14l together define a hexagonal shape. In other embodiments, each segment 14a, 14b may only include two walls or may include more than three walls. The tangential forces created by fasteners 22, force middle portions of walls 14k, 14l against outer diameter surface 12a such that contact between walls 14k, 14l and outer diameter surface 12a causes segments 14a, 14b to grip tube 12. In the preferred embodiment of FIG. 2, the inner diameter surfaces of clamp end segments 20a, 20b can be formed in the same manner as the inner diameter surfaces of clamp end segments 14a, 14b and can contact outer surface 12a in the same manner to grip tube 12.

FIGS. 3a, 3b and 3c show different cross-sectional views of clamp sealing apparatus 10. FIG. 3a shows clamp sealing apparatus 10 as viewed along X-X in FIG. 2; FIG. 3b shows clamp sealing apparatus 10 as viewed along Y-Y in FIG. 2; and FIG. 3c shows a clamp sealing apparatus 10 as viewed along Z-Z in FIG. 2, except with fasteners 22, 24, 26, 28 shown in their entirety. Segments 14a, 14b, 20a, 20b are in the form of half discs, each including two radially extending surfaces, viewed as upper and lower surfaces in FIGS. 3a to 3c, connected by an inner diameter surface and an outer diameter surface.

Segments 16a, 16b each includes a radially extending portion 16c, which is shaped as a half ring, and an axially extending portion 16d, which is shaped as a half ring. Radially extending portions 16c each include a first radially extending surface 16e, viewed as the upper surface in FIGS. 3a to 3c, that extends from an inner diameter surface to an outer diameter surface of the respective segment 16a, 16b and a second radially extending surface 16f, viewed as the upper surface in FIGS. 3a to 3c, that extends from the outer diameter surface of the respective segment 16a, 16d to the outer diameter surface 16g of the respective axial extending portion 16d.

As shown in FIG. 3c, radially extending portion 16c of segment 16b is provided with a locating pin 17a of a first shape—here round—at a first circumferential end thereof and a locating pin 17b of a second shape—here diamond—at a second circumferential end thereof. Round locating pin 17a is configured for being received in a round hole in radially extending portion 16c of segment 16a and diamond locating pin 17b is configured for being receiving in a round hole in radially extending portion 16c of segment 16a to properly align segments 16a, 16b with each other on tube 12. The diamond shape allows for machining inaccuracies and smoother locating operation by having additional clearance in the diamond's minor axis.

As shown in FIG. 3b, fasteners 30a, 31a hold radially extending surfaces 14m of segments 14a, 14b, respectively, against radially extending surfaces 16e. Axially extending portions 16d each extend axially from the respective portion 16c and away from the respective segment 14a, 14b. At a free end thereof, axially extending portions 16d are each split into a radially outer rim section 16h and a radially inner rim section 16i, with rim sections 16h, 16i being separated by a circumferentially extending gap 32.

Segments 18a, 18b each includes a radially extending portion 18c, which is shaped as a half ring, and an axially extending portion 18d, which is shaped as a half ring. Radially extending portions 18c each include a first radially extending surface 18e, viewed as the lower surface in FIGS. 3a to 3c, that extends from an inner diameter surface to an outer diameter surface of the respective segment 18a, 18b and a second radially extending surface 18f, viewed as the upper surface in FIGS. 3a to 3c, that extends from the outer diameter surface of the respective segment 18a, 18d to the inner diameter surface 18g of the respective axial extending portion 18d. Axially extending portions 18d each extend axially from the respective portion 18c and away from the respective segment 20a, 20b. Axially extending portions 18d each include a radially extending surface 18h, viewed as the upper surface in FIGS. 3a to 3c, extending from the outer diameter surface of the respective segment 18a, 18b to the inner diameter surface 18g of the respective axially extending portion 18d.

As shown in FIG. 3c, axially extending portion 18d of segment 18b is provided with a locating pin 19a of a first shape—here round—at a first circumferential end thereof and a locating pin 19b of a second shape—here diamond—at a second circumferential end thereof. Round locating pin 19a is configured for being received in a round hole in axially extending portion 18d of segment 18a and diamond locating pin 19b is configured for being receiving in a round hole in axially extending portion 18d of segment 18a to properly align segments 18a, 18b with each other on tube 12.

As shown by viewing FIGS. 3a, 3b together, fasteners 30a, 31a and fasteners 30b, 31b, which are circumferentially offset from fasteners 30a, 31a, hold radially extending surfaces 16f of segments 16a, 16, respectively, against radially extending surfaces 18h of segments 18a, 18b. Fasteners 30a, 31a each include a head 39a and a threaded shank 39b, with shank 39b extending from away from head 39a through a respective hole 14n in the respective segment 14a, 14b into a hole 16k in radially extending portion 16c of the respective segment 16a, 16b and into a threaded hole 18k in axially extending portion 18d of the respective segment 18a, 18b. Fasteners 30b, 31b each include a head 40a and a threaded shank 40b, with head 40a being received in larger diameter portion of a hole 16j radially extending portion 16c of the respective segment 16a, 16b and shank 40b extending from a smaller diameter portion of hole 16j in radially extending portion 16c into a threaded hole 18j in axially extending portion 18d of the respective segment 18a, 18b.

As shown in FIG. 3b, fasteners 30c, 31c, hold radially extending surfaces 20c of segments 20a, 20b, viewed as the upper surface in FIGS. 3a to 3c that extend from the outer diameter surface to the inner diameter surface of the respective segment 20a, 20b, against radially extending surfaces 18e of segments 18a, 18b. Fasteners 30c, 31c each include a head 42a and a threaded shank 42b, with head 42a abutting the respective segment 20a, 20b and shank 42b extending through a hole 20d in the respective segment 20a, 20 into a threaded hole 18i in the respective segment 18a, 18b.

Compression segments 16a, 16b and clamp body segments 18a, 18b hold a seal 44 axially therebetween and onto outer circumferential surface 12a of tube 12 at a defective region 12b (FIG. 3c) of tube 12. More specifically seal 44 is held axially between axially extending portions 16d of segments 16a, 16b and radially extending portions 18c of segments 18a, 18b. Seal 44 can be formed of one or more seal layers, with each seal layer being a graphite packing layer in one preferred embodiment. In the embodiment shown in FIGS. 3a to 3c, seal 44 includes two graphite packing layers 46a, 46b, which includes a radially inner layer 46a contacting outer diameter surface 12a of tube 12 and a radially outer layer 46b contacting inner diameter surface 18g of axially extending section 18d of segments 18a, 18b. Layers 46a, 46b are held radially away from each other and in place by a split graphite packing divider 48. Divider 48 provides separate annuli for compressing the inner layer 46a and outer layer 46b separately, and divider 48 increases the distance a leak would travel before reaching the outside of the clamp sealing apparatus 10. Divider 48 is held in gap 32 between rims 16i, 16h and extends axially between layers 46a, 46b from gap 32 along an entire axial length of the outer packing layer 46b and along a majority of the axial length of the inner packing layer 46a.

More specifically, as referenced in FIG. 3c, divider 48 includes, beginning from a first end of divider 48, an axially extending portion 48a extending from gap 32 along an entire axial length of the outer packing layer 46b and into a radially extending portion 48b of divider 48, which forms a second end of divider 48. Radially extending portion 48b extends along the thickness of the end of the outer packing layer 46b and into inner diameter surface 18g of axially extending section 18d of segments 18a, 18b. Compression segments 16a, 16b compress seal 44, in particular graphite packing layers 46a, 46b, axially against body segments 18a, 18b such that upon radial compression of seal 44 against outer diameter surface 12a of tube 12 by body segments 18a, 18b, generated by the tangential forces of fasteners 26, seal 44 prevents high pressure fluid from leaking out of the defective region 12b of tube 12.

Each packing layer 46a, 46b is formed of a plurality of graphite rings 47 stacked axially against each other, with each ring 47 axially contacting a radially extending surface of the adjacent ring(s) 47. In the embodiment shown in FIGS. 3a to 3b each layer includes eight rings 47, with each of rings 47 of layer 46a radially abutting outer diameter surface 12a of ring and inner diameter surface of divider 48 and each of rings 47 of layer 46a radially abutting the outer diameter surface of the divider 48 and inner diameter surfaces 16g of the respective axial extending portions 16d. In the embodiment shown in FIGS. 3a to 3b, rings 47 each have a rectangular cross-section and are compressed to seal the defective region 12b of tube 12 to prevent leakage.

In the embodiments shown in FIGS. 3a to 3c, each graphite packing layer 46a, 46b is made up of pure 99% assay graphite filament with a fine graphite particle impression which is constructed of interwoven braids with a square shaped cross section. The graphite packing can be purchased for example from PALMETTO at sells graphite in various lengths and can be cut by the installer of seal assembly 10 to match the outer circumference of tube 12. The graphite packing allows sealing at high temperatures and pressures. The outer packing layer 46b provides a secondary seal, with the seams of the rings 47 of outer packing layer 46 being 90 degrees from the seams of the inner packing layer 46a in order to create a more treacherous path for fluid if the fluid were to seep from any of the seams of inner packing layer 46a.

A method of installing seal assembly 10 onto tube 12 at the defective region may include the following steps. First, end segments 20a, 20b are fastened to outer diameter surface 12a of tube 12 by placing inner diameter surfaces of segments 20a, 20b onto outer diameter surface 12a and aligning the tangentially extending holes of segment 20a with the tangentially extending holes of segment 20b. Segments 20a, 20b are placed onto tube 12 at a distance X (FIG. 3c) from the centerline of defective region 12b, with radially extending surface 20c being the distance X from the centerline of the defective region 12b. Segments 20a, 20b are then fastened together by fasteners 28, which are sufficiently tightened such that the tangential forces generated by fasteners 28 cause the walls of the inner diameter surfaces of segments 20a, 20b—walls which as noted above extending tangentially to outer diameter surface 12a—to grip outer surface 12a such that segments 20a, 20b are axially immovable, to form second clamp end 20.

After clamp end 20 is fastened to tube 12, segments 18a, 18b are fixed together around outer diameter surface 12a of tube 12 to form clamp body 18, which is then fixed to clamp end 20. Locating pins 19a, 19b of segment 18b are inserted into the corresponding holes in segment 18a such that the tangentially extending holes of segment 18a are aligned with the tangentially extending holes of segment 18b. Segments 18a, 18b are then fastened together by fasteners 26, which are sufficiently tightened such that there is no play between segments 18a, 18b, to form clamp body 18. Next, with radially extending surfaces 18e of segments 18a, 18b in contact with radially extending surfaces 20c of segments 20a, 20b, respectively, axially extending holes 18i in segments 18a, 18b are aligned with axially extending holes 20d in segments 20a, 20b, respectively, and fasteners 31c are inserted through holes 20d and into holes 18i and sufficiently tightened to axially fix clamp body 18 to clamp end 20 such that clamp body 18 is axially immovable. Clamp body 18 is fastened to pipe 12, via clamp end 20, in a manner that forms a cylindrical blind bore 50 between inner diameter surfaces 18g of axially extending portions 18d of segments 18a, 18b and outer diameter surface 12a of tube 12.

After clamp body 18 is fixed to clamp end 20, seal 44 is inserted into bore 50 such that seal 44 is held by clamp body 18, particularly by axially extending portions 18d, radially against outer diameter surface 12a of tube 12. More specifically, the radially outer seal layer 46b is placed into contact with inner diameter surfaces 18g of axially extending portions 18d of segments 18a, 18b and radially inner seal layer 46a is placed into sealing contact with outer diameter surface 12a in defective region 12b, while one end of divider 48 abuts radially extending surface 18f. In one embodiment, rings 47 each include a seam connecting to circumferential ends thereof. The rings of each layer 46a, 46b are aligned such that the seam of adjacent rings 47 are staggered 180 degrees from each other and the seams of rings 47 of layer 46a are approximately 90 degrees from the split line of divider 48 and the rings of layer 46b are approximately 45 degrees from the split line of divider 48.

After seal 44 is inserted into bore 50, segments 16a, 16b are fixed together around outer diameter surface 12a of tube 12 to form compression section 16, which is then fixed to clamp body 18. Locating pins 17a, 17b of segment 16b are inserted into the corresponding holes in segment 16a such that the tangentially extending holes of segment 16a are aligned with the tangentially extending holes of segment 16b. Segments 16a, 16b are then fastened together by fasteners 24, which are sufficiently tightened such that there is no play between segments 16a, 16b, to form compression section 16. Compression section 16 is then installed onto clamp body 18 in a manner that axially compresses seal 44. In one preferred embodiment, seal layers 46a, 46b are axially compressed to a level from 25% to 30% of their original axial length. For example, in reference to FIG. 3c, layers 46a could have an original first axial length L1 when inserted into bore 50, then upon installation of compression section 16 onto clamp body 18, layers 46a, 46b are each compressed to an axial length L2, with L2 being 25% to 30% less than L1 ($0.70L1 \leq L2 \leq 0.75L1$).

The installation of compression section 16 onto clamp body 18 includes forcing axially extending portions 16d into bore 50 such that rims 16h contact and axially compress layer 46b and rims 16i axially contact and axially compress layer 46a, while one end of divider 48 is received in gap 32. The axial compression of layers 46a, 46b causes outer layer 46b to radially expand into forceful contact with the inner diameter surfaces 16g of the respective axial extending portions 16d and causes inner layer 46a to radially expand into forceful contact with outer diameter surface 12a of tube 12 to seal outer diameter surface 12a and prevent fluid leakage at defective region 12b. Axially extending portions 16d are forced axially toward radially extending portions 18c until radially extending surfaces 16f of compression section 16 contact radially extending surfaces 18h of clamp body 18.

Then, as shown in FIG. 3a, axially extending holes 16i in segments 16a, 16b are aligned with axially extending holes 18i in segments 18a, 18b, respectively, and fasteners 31b are inserted through holes 16j and into holes 18j and sufficiently tightened to axially fix compression section 16 to clamp body 18 such that compression section 16 is axially immovable. Compression section 16 is fastened to pipe 12, via clamp body 18 and clamp end 20, in a manner that axially compresses seal layers 46a, 46b in bore 50 and radially clamps seal 44 against outer diameter surface 12a of tube 12 at defective region 12b to prevent leakage of high pressure fluid from the inside of tube 12 through the defective region 12b to outer diameter surface 12a.

Lastly, end segments 14a, 14b are fastened to outer diameter surface 12a of tube 12 and fixed to compression section 16. The inner diameter surfaces of segments 14a, 14b, in the form of walls 14k, 14l (FIG. 2), are placed onto outer diameter surface 12a and the tangentially extending holes 14g (FIG. 2) of segment 14a are aligned with the tangentially extending holes 14h (FIG. 2) of segment 14b while the axially extending holes 14n of segments 14a, 14b are aligned with the respective axially extending holes 16k of segments 16a, 16b. Segments 14a, 14b are fastened together by fasteners 22 to form clamp end 14, but segments 14a, 14b are not fully tightened, and fasteners 30a, 31a are installed in respective holes 14n, 16k, 18k, to fasten clamp end 14 onto compression section 16, but are not fully tightened. Fasteners 22 are sufficiently tightened such that the tangential forces generated by fasteners 22 cause the walls 14k, 14l of the inner diameter surfaces of segments 14a, 14b to grip outer surface 12a such that segments 14a, 14b are axially immovable with respect to tube 12, then fasteners 30a, 31a are sufficiently tightened such that clamp end 14 is immovably fixed to clamp section 16, clamp body 18 and clamp end 20. After the fixing of clamp end 14 in place, clamp sealing apparatus 10 is removably held in place onto tube 12 such that seal 44 prevents high pressure fluid from leaking out of defective region 12b of tube 12.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A clamp sealing apparatus configured for preventing leakage from a defective region of a tube comprising:
   a first clamping section and a second clamping section tangentially connected to each other; and
   a seal held by the first and second clamping sections,
   each of the first and second clamping sections including a segment of a clamp body and a segment of a compression section, the clamp body and the compression section configured for axially compressing the seal between the clamp body and the compression section such that the seal is pressed radially against an outer diameter surface of the tube onto the defective region by the axial compression to seal the defective region,
   the first and second clamp sections including at least one clamp end configured for being fixed to at least one of the compression section and the clamp body, the at least one clamp end being configured for gripping the outer diameter surface of the tube to hold the compression section and the clamp body axially in place on the tube.

2. The clamp sealing apparatus as recited in claim 1 wherein the at least one clamp end includes a first clamp end configured for being removably fixed to the compression section and a second clamp end configured for being removably fixed to the clamp body, each of the first and second clamp ends being configured for gripping the outer diameter surface of the tube to hold the compression section and the clamp body axially in place on the tube.

3. The clamp sealing apparatus as recited in claim 2 further comprising a first set of fasteners for removably fixing the compression section and the clamp body axially together, a second set of fasteners for removably fixing the compression section and the first clamp end axially together and a third set of fasteners for removably fixing the clamp body and the second clamp end together.

4. The clamp sealing apparatus as recited in claim 1 wherein each of the first and second clamping sections include a segment of the at least one clamp end.

5. The clamp sealing apparatus as recited in claim 1 wherein the segments of the clamp body are half rings that are tangentially connected together and the segments of the compression section are half rings that are tangentially connected together.

6. The clamp sealing apparatus as recited in claim 1 wherein the seal includes a plurality of compressible rings stacked axially against each other.

7. The clamp sealing apparatus as recited in claim 6 wherein the compressible rings form at least one sealing layer, the clamp body and the compression section being configured for axially compressing the at least one sealing layer by 25% to 30% of an original axial length of the at least one sealing layer.

8. The clamp sealing apparatus as recited in claim 1 wherein the seal includes a radially outer sealing layer configured for being radially compressed against an inner diameter surface of an axially extending portion of the clamp body and a radially inner sealing layer configured for being radially compressed against the outer diameter surface of the tube.

9. The clamp sealing apparatus as recited in claim 8 wherein each of the radially outer sealing layer and the radially inner sealing layer includes a plurality of compressible rings stacked axially against each other.

10. The clamp sealing apparatus as recited in claim 9 further comprising a divider holding the radially outer sealing layer and the radially inner sealing layer radially away from each other.

11. The clamp sealing apparatus as recited in claim 1 wherein the clamp body includes an axially extending portion having an inner diameter surface configured for contacting an outer diameter surface of the seal, the clamp body further including a radially extending portion configured for axially contacting the seal.

12. The clamp sealing apparatus as recited in claim 11 wherein the compression section includes an axially extending portion configured for positioning radially inside of the axially extending portion of the clamp body, the axially extending portion of the compression section and the radially extending section of the clamp body being configured for axially compressing the seal therebetween.

13. A clamp sealing apparatus configured for preventing leakage from a defective region of a tube comprising:
    a first clamping section and a second clamping section tangentially connected to each other; and
    a seal held by the first and second clamping sections,
    each of the first and second clamping sections including a segment of a clamp body and a segment of a compression section, the clamp body and the compression section configured for axially compressing the seal between the clamp body and the compression section such that the seal is pressed radially against an outer diameter surface of the tube onto the defective region by the axial compression to seal the defective region,
    wherein the seal includes graphite rings stacked axially against each other.

14. A method of sealing a defective region of a tube to prevent fluid leakage through the defective region comprising:
    tangentially connecting segments of a clamp body to each other and fixing the clamp body to the tube;
    inserting a seal between a portion of the clamp body and an outer diameter surface of the tube; and
    tangentially connecting segments of a compression section to each other and axially compressing the seal between the clamp body and the compression section such that the seal is pressed radially against the outer diameter surface of the tube by the axial compression onto the defective region to seal the defective region, wherein the axially compressing of the seal radially compresses a radially outer sealing layer of the seal against an inner diameter surface of an axially extending portion of the clamp body and radially compresses a radially inner sealing layer of the seal against the outer diameter surface of the tube.

15. The method as recited in claim 14 further comprising fixing at least one clamp end to the tube, the at least one clamp end fixing the compression section and the clamp body to the tube by gripping the outer diameter surface of the tube.

16. The method as recited in claim 15 wherein the at least one clamp end includes a first clamp end fixed to the compression section and a second clamp end fixed to the clamp body, each of the first and second clamp ends fixing the compression section and the clamp body to the tube by gripping the outer diameter surface of the tube.

17. The method as recited in claim 14 wherein the inserting of the seal includes axially stacking a plurality of compressible rings against each other.

18. The method as recited in claim 17 wherein the compressible rings form at least one of the radially outer sealing layer and the radially inner sealing layer, the axially compressing of the seal including axially compressing the at least one of the radially outer sealing layer and the radially inner sealing layer by 25% to 30% of an original axial length of the at least one of the radially outer sealing layer and the radially inner sealing layer.

19. The method as recited in claim 18 wherein the compressible rings are graphite rings.

20. The method as recited in claim 14 wherein the clamp body includes an axially extending portion having an inner diameter surface contacting an outer diameter surface of the seal, the clamp body further including a radially extending portion configured for axially contacting the seal, the axially compressing of the seal including inserting an axially extending portion of the compression section radially inside of the axially extending portion of the clamp body such that the seal is axially compressed between the axially extending portion of the compression section and the radially extending section of the clamp body.

* * * * *